Figure 1:
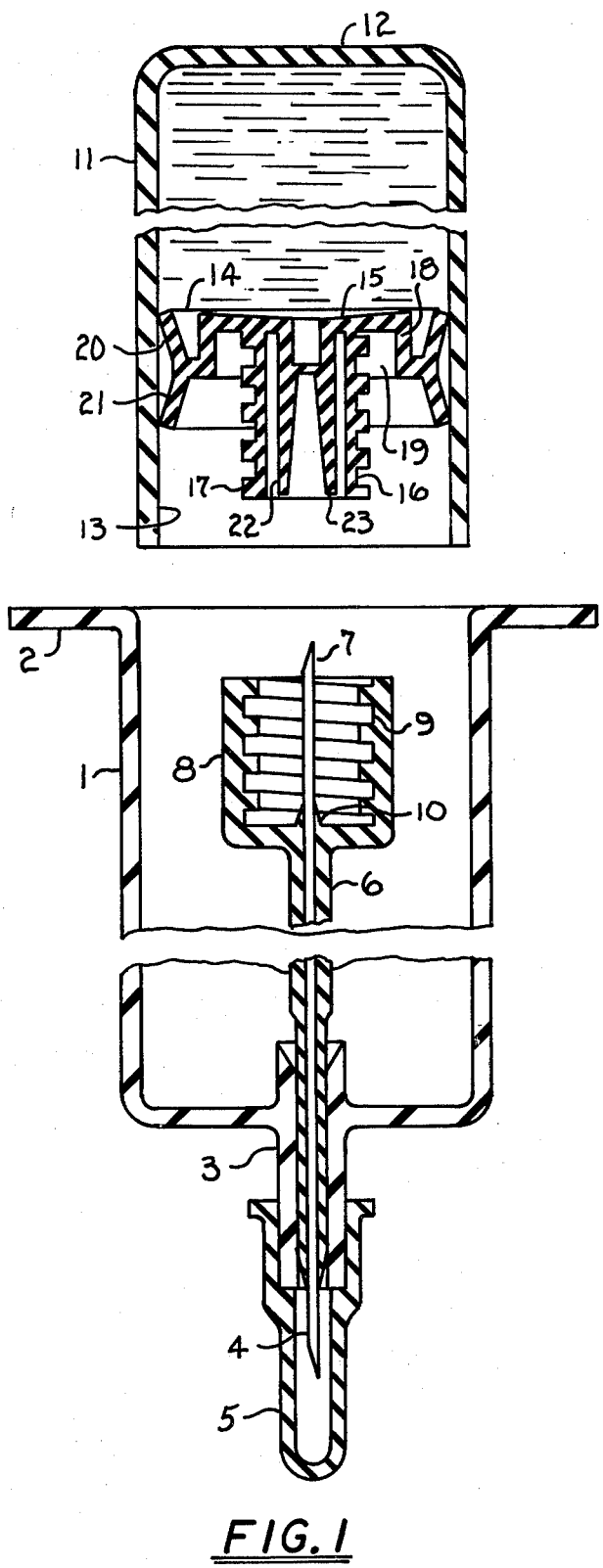

United States Patent [19]
Cloyd

[11] 3,916,894
[45] *Nov. 4, 1975

[54] SYRINGE SEALS AND PISTON
[75] Inventor: Harold S. Cloyd, Erie, Pa.
[73] Assignee: Nosco Plastics, Incorporated, Erie, Pa.
[*] Notice: The portion of the term of this patent subsequent to Oct. 23, 1990, has been disclaimed.
[22] Filed: Jan. 24, 1974
[21] Appl. No.: 436,113

Related U.S. Application Data
[63] Continuation of Ser. No. 290,436, Sept. 20, 1972, abandoned.

[52] U.S. Cl. .......................... 128/220; 128/218 P
[51] Int. Cl.² .................. A61M 5/24; A61M 5/315
[58] Field of Search ............ 128/215, 218 R, 218 P, 128/218 D, 218 DA, 218 F, 218 M, 220, 128/272, 218 NV, 216

[56] References Cited
UNITED STATES PATENTS

| | | | |
|---|---|---|---|
| 2,505,307 | 4/1950 | Smith | 128/218 D |
| 2,841,143 | 7/1958 | Bertram | 128/216 |
| 2,864,364 | 12/1958 | Mizzy | 128/220 |
| 2,866,458 | 12/1958 | Hein, Jr. | 128/218 F |
| 3,084,688 | 4/1963 | McConnaughey | 128/218 NV |
| 3,094,988 | 6/1963 | Dunmire | 128/216 |
| 3,094,989 | 6/1963 | Stauffer | 128/218 F |
| 3,123,073 | 3/1964 | Barr, Sr. et al. | 128/DIG. 5 |
| 3,176,595 | 4/1965 | Schwartz | 128/218 P |
| 3,376,866 | 4/1968 | Ogle | 128/220 |
| 3,378,008 | 4/1968 | Ogle | 128/220 |
| 3,543,755 | 12/1970 | Kessel | 128/272 |
| 3,552,387 | 1/1971 | Stevens | 128/272 |
| 3,557,778 | 1/1971 | Hughes | 128/218 NV |

FOREIGN PATENTS OR APPLICATIONS

| | | | |
|---|---|---|---|
| 1,938,864 | 2/1970 | Germany | 128/220 |
| 888,863 | 12/1971 | Canada | 128/218 P |
| 1,242,553 | 8/1960 | France | 128/218 P |
| 1,500,009 | 9/1967 | France | 128/218 P |

*Primary Examiner*—Richard A. Gaudet
*Assistant Examiner*—Rick Opitz
*Attorney, Agent, or Firm*—Ralph Hammar

[57] ABSTRACT

An injection molded thermoplastic stopper for syringes having the seal to the barrel effected by a flange extending outward at an acute angle and having its outer edge compressed by engagement with the barrel to provide the sealing pressure and further having a thin plastic diaphragm which is pierced by a hypodermic needle when the contents of the syringe are to be dispensed and a seal to the outer surface of the hypodermic needle on the downstream side of the diaphragm.

13 Claims, 2 Drawing Figures

U.S. Patent    Nov. 4, 1975    3,916,894

SYRINGE SEALS AND PISTON

This is a continuation of application Ser. No. 290,436, filed Sept. 20, 1972, now abandoned.

This invention is a plastic stopper for hypodermic syringes which is of particular advantage in factory loaded syringes because plastic is of lower cost and more indifferent to the contents of the syringe than the rubber stopper heretofore used. Also, plastics have coefficients of friction lower than rubber and, therefore, do not require lubrication.

Figure 2:
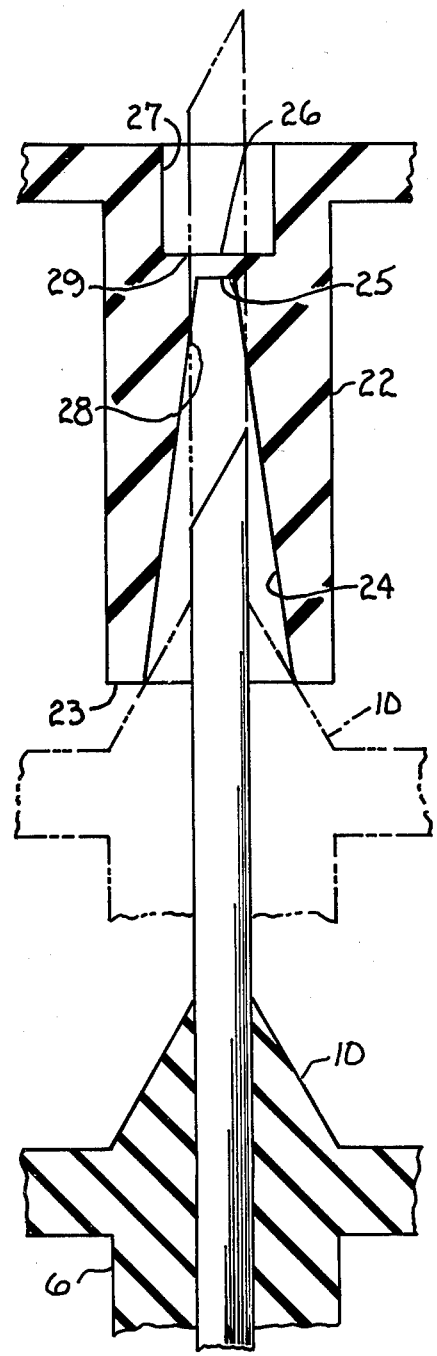

In the drawing,

FIG. 1 is a sectional elevation of a syringe equipped with a preferred form of stopper and FIG. 2 is an enlarged fragmentary section of the seals between the stopper and the outer surface of the needle.

The syringe shown in FIG. 1 is of the inverted type described in greater detail in application Ser. No. 749,448 filed Aug. 1, 1968, application Ser. No. 98,226 filed Dec. 15, 1970, now U.S. Pat. No. 3,766,919, incorporated by reference. The syringe there described comprises a cylindrical holder 1 having finger grip portions 2 at one end and a hub 3 at the other end in which is fixed or bonded a double ended hypodermic needle 4. The lower pointed end of the needle is protected by a needle protector 5 removably mounted on the hub 3. The mid section of needle 4 is embedded in an extension 6 of the hub 3 and the upper pointed end 7 of the needle extends through a socket 8 integral with the hub extension 6. The side walls of the socket 8 are provided with internal threads 9 and the bottom wall of the socket has an upstanding taper or conical projection 10. As will be described, the internal threads 9 comprise connecting means for connecting the socket to the piston of a syringe. In the syrings of this application, and the conical projection 10 is for the purpose of making a liquid tight seal around the needle.

The barrel of the syringe comprises a vial 11 having its upper end 12 closed and its side wall 13 presented in telescopic relation to the inner walls of the holder 1. The vial may be factory filled with the liquid to be injected, which is sealed in the vial by a plastic stopper 14.

The stopper 14 has a closed upper end 15 from the under side of which depends an axially projecting, hollow or tubular hub 16. The hub is provided with external threads 17 which may be screwed into the internal threads 9 on the socket 8 to establish a push or pull mechanical connection between the hub and socket. At the outer edge of the end section 15 is a rim 18 having its upper edge integral with the section 15. The rim depends axially around the upper end of the hub 16 and spaced is from the hub by a reentrant recess 19 which receives the upper end of the socket 8 when the hub 16 is screwed into the socket. Integral with the lower edge of the rim 18 are upwardly and downwardly extending cylindrical flanges 20, 21, each diverging at an acute angle to the inner side wall 13 of the barrel 11. As molded, the outside diameter of the outer edges of the flanges 20, 21 is greater than the inside diameter of the wall 13 of the barrel so that when inserted into the barrel, the edges of the flanges 20, 21 are compressed radially inward and the resultant deflection of the flanges develops a liquid tight sealing pressure between the outer edges of the flanges and the barrel due to the inherent resilience of the flanges. To obtain the liquid tight seal, the flanges must be stiff enough to develop adequate sealing pressure by deflection of the flanges. For polyethylene, the thickness of the flanges must be substantial (e.g. 20–75 mils). The axial length of the flanges should be small (e.g., 1/8–5/32 inch). The outer edges of the flanges should be thick enough to sustain the sealing pressure. These dimensions are by way of example and not of limitation. The seal established by deflection of the flanges prevents leakage of the liquid contents during shipment and storage.

The stopper 14 also serves as a piston. The inclination of the flange 20 is such that as the stopper is moved toward the bottom 12 of the barrel, a hydraulic pressure is developed, increasing the sealing pressure between the outer edge of the flange 20 and the barrel. Upon moving the stopper out of the barrel, the suction is developed within the barrel and atmospheric pressure forces the flange 21 outward into tighter sealing engagement with the barrel.

Within the hollow hub 16 is a depending tubular section 22 having a lower end 23 sealing against the tapered projection 10 when the hub is screwed into the socket. The tubular hub 16 surrounds and is radially spaced from the tubular section 22. The lower end 23 and the conical surface or taper of projection 10 are sealing surfaces which provide a liquid tight seal which prevents leakage around the needle into the socket 8. The projection 22 has a recess or bore 24 which as shown in FIG. 2 tapers to a diameter less than the outside diameter of the needle and terminates on the under side 25 of a diaphragm 26. The upper side of the diaphragm 26 is at the bottom of an enlarged recess 27. FIG. 2 shows in full lines the needle in its initial position entering the tapered bore 24 of the projection 22. At this position the lower end 23 is widely separated from the tapered sealing surface 10. In the final position of the needle shown in dotted lines, the lower end 23 is clamped in sealing engagement with the taper 10 and the upper end of the needle has punctured the diaphragm. The structure for clamping the sealing surfaces together is the interengaging threads 9, 17. Between point 28 where the diameter of the bore 24 is substantially equal to the outside diameter of the needle and point 29 where the diameter of the bore is less than the outside diameter of the needle, the outer surface of the needle is in sealing engagement with the bore. There are, accordingly, two seals which prevent leakage around the needle, either of which is adequate. As the needle is forced through the diaphragm 26, the diaphragm may tear and if it were not for the seals, liquid might flow through the tear around the outer surface of the needle. The socket 27 provides space for deflection or displacement of the material of the diaphragm 26 as the needle is forced through it.

The entire stopper 14 is adapted to injection molding from one of the inert, flexible thermoplastics such as polyethylene, polypropylene, etc. These plastics have low coefficients of friction and therefore do not require lubrication. While these plastics do not have the self sealing properties of rubber in the sense that the plastics may not seal around the needle as it is forced through the diaphragm 26, the structure of the stopper is such that an adequate seal is obtained around the needle either by the tapered bore 24 or by engagement of the lower end 23 with the tapered sealing surface 10. The diaphragm 26 is preferably very thin, a few mils thick, so the hollow needle point 7 is screwed through the diaphragm in a fraction of a turn and there is no coring. The needle point 7 need not be sharp as shown. The diaphragm need only tear or rupture to establish communication between the needle and the liquid contents of the vial and this takes place when the needle point 7 is blunt. The enlarged socket 27 above the diaphragm 26 facilitates rupturing of the diaphragm The stopper 14 can be made at a small fraction of the cost and can accommodate larger variations of the inside diameter of the vial than rubber stoppers. The flanges 20, 21 deflect as cantilever beams and a variation in inside diameter of the vial of 10 to 20 mils does not significantly affect the sealing pressure. When the flanges are designed to have adequate sealing pressure for vials of maximum inside diameter, the increase in sealing pressure in the vials of smallest inside diameter does not objectionably increase the friction between the flanges and vial.

I claim:

1. A hypodermic syringe structure comprising a barrel open at one end, a plastic stopper piston in said barrel movable in one direction to develop hydraulic pressure expelling fluid from the barrel, said stopper having a plastic body with means for making sealing engagement with said barrel, said body having a tubular portion extending axially in a direction opposite said one direction, said tubular portion having an open end and a plastic diaphragm extending across and closing said tubular portion inward from said open end in position to be punctured, a hub movable relative to the piston, a hypodermic needle fixed in said hub and having one end projecting from said hub and received in said tubular portion and puncturing said diaphragm as said one end of the needle is moved into said open end and having a second end projecting oppositely from said hub for injecting fluid, said stopper including the body, tubular portion and diaphragm being injection molded inert flexible thermoplastic which does not have the self sealing properties of rubber as the needle is forced through the diaphragm to establish communication between the needle and the contents of the barrel, a first axially facing sealing surface on the open end of said tubular portion, a second sealing surface on the hub presented to said first sealing surface, said sealing surfaces surrounding the needle and means clamping said body and hub axially to bring said sealing surfaces together into sealing engagement for stopping leakage around the needle in case the diaphragm does not seal around the needle when it is punctured.

2. The structure of claim 1 in which said body has a closed end the outer edge of which is integral with one edge of a rim extending axially in a direction opposite said one direction and the means for making sealing engagement with said barrel is on the axially spaced from said one edge of said rim.

3. The structure of claim 2 in which the means for making sealing engagement with the barrel comprises a flange integral with a portion of said rim spaced axially from its said one edge, said flange being inclined outwardly from the axis of the barrel and forwardly in said one direction into sliding contact with the bore of the barrel, said flange providing a fluid-tight seal both when fluid in the barrel is under pressure to expel fluid from the barrel, and under static conditions during shipping and storage by reason of the following factors:

a. the outer edge of the flange is thick enough to sustain the sealing pressure under static conditions and of outside diameter greater than the inside diameter of the bore of the barrel before it is inserted into the barrel, and b. the flange is of such stiffness that the deflection of the flange alone, when fitted inside the barrel without any other separate parts, results in sealing pressure to maintain a fluid-tight seal under static conditions so that the seal formed thereby is suitable for a syringe which is to be shipped assembled, containing the fluid to be dispensed.

4. The structure of claim 1 in which the second sealing surface is a taper on the hub.

5. The structure of claim 1 in which the means clamping said body and hub axially comprise another tubular portion on said body which surrounds and is spaced radially outward from the first tubular portion and interengaging screw threads on the said other portion of said hub.

6. The structure of claim 5 in which the screw threads on the hub are on a socket telescoped over said other tubular portion.

7. The structure of claim 1 in which the means for making sealing engagement with said barrel comprises a plastic flange which is inclined outwardly from the axis of the barrel and forwardly in said one direction into sliding contact with the bore of the barrel, said flange providing a fluid-tight seal both when fluid in the barrel is under pressure to expel fluid from the barrel, and under static conditions during shipping and storage by reason of the following factors:

a. the outer edge of the flange is thick enough to sustain the sealing pressure under static conditions and of outside diameter greater than the inside diameter of the bore of the barrel before it is inserted into the barrel, and b. the flange is of such stiffness that the deflection of the flange alone, when fitted inside the barrel without any other separate parts, results in sealing pressure to maintain a fluid-tight seal under static conditions so that the seal formed thereby is suitable for a syringe which is to be shipped assembled, containing the fluid to be dispensed.

8. The structure of claim 6 in which said body has a reentrant recess formed by said rim and said other tubular portion which receives the upper end of the socket when the screw threads on the hub and socket are engaged.

9. The structure of claim 3 in which the flange has a thickness of about 0.020 to 0.075 inches.

10. The structure of claim 7 in which the flange has a thickness of about 0.020 to 0.075 inches.

11. A hypodermic syringe structure comprising a barrel open at one end, a plastic stopper piston in said barrel movable in one direction to develop a hydraulic pressure to expel fluid from the barrel, said stopper having a plastic body, said body having a closed end and the outer edge of which is integral with one edge of a rim extending axially in a direction opposite said one direction with means on said rim for making sealing engagement with said barrel, an externally threaded axially extending tubular portion within said rim and having one end integral with said closed end, said tubular portion extending from said closed end in the same direction as said rim, a hub having an internally threaded socket mating with the threads on said tubular portion for moving the hub in said one direction relative to the stopper, a hypodermic needle fixed in said hub and having one end projecting from said hub and extending within said tubular portion and having a second end projecting oppositely from said hub for injecting fluid, said closed end having an integral plastic diaphragm in position to be punctured as said hub is moved in said one direction relative to the stopper, said stopper including the body, tubular portion and diaphragm being of injection molded inert flexible thermoplastic which does not have the self sealing properties of rubber as the needle is forced through the diaphragm to establish communication between the needle and the contents of the barrel, and means for making a seal for stopping leakage around the outer surface of the needle in case the diaphragm does not seal around the needle as it is punctured.

12. The structure of claim 11 in which the means on said rim for making sealing engagement with said barrel comprises a plastic flange integral with and diverging outward from a portion of said rim axially spaced from said one edge of the rim at an acute angle toward the barrel, the unstressed diameter of the outer edge of the flange being greater than the inside diameter of the barrel so the outer edge of the flange is compressed by the barrel and the thickness of the flange being sufficient to provide a liquid tight seal between the outer edge of the flange and the barrel solely by said deflection of the flange due to the inherent resilience of the flange.

13. The structure of claim 12 in which the flange has a thickness of about 0.020 to 0.075 inches.

* * * * *